Dec. 28, 1937.   H. N. BLISS ET AL   2,103,659
MULTIPLEX COUNTING MACHINE
Filed Feb. 20, 1936   2 Sheets-Sheet 1

Inventor
HARVEY N. BLISS
EDWARD WILD
WILLIAM L. TANCRED
By N. Clay Lindsey   Attorney Dec. 28, 1937.  H. N. BLISS ET AL  2,103,659
MULTIPLEX COUNTING MACHINE
Filed Feb. 20, 1936  2 Sheets-Sheet 2
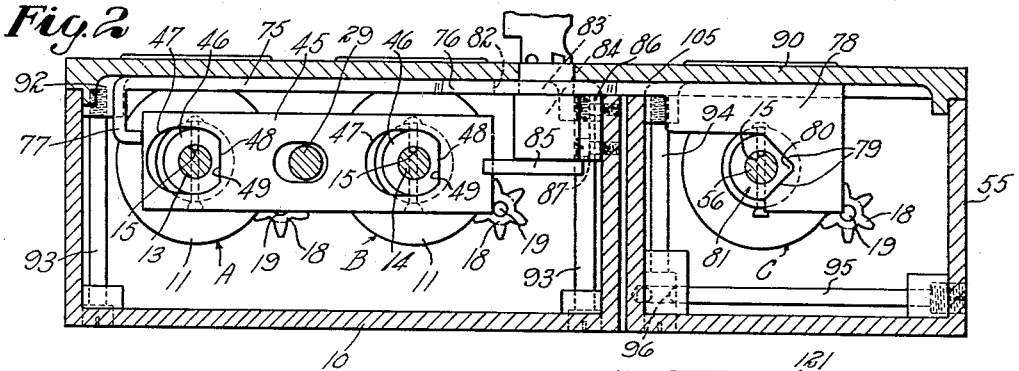
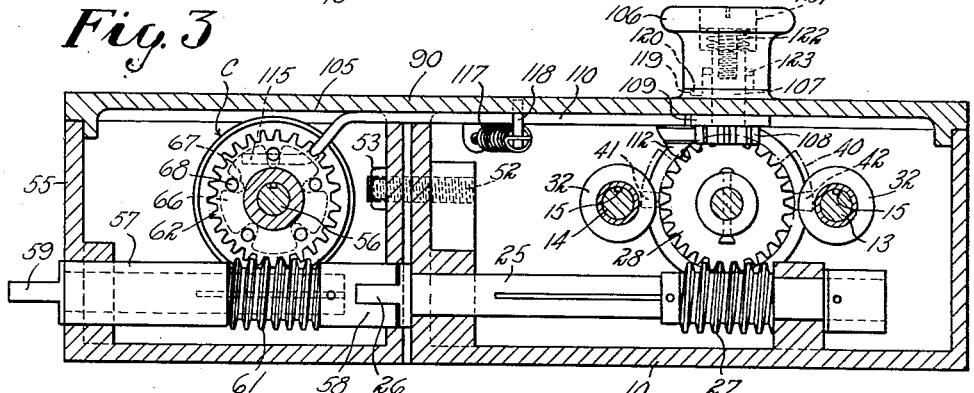
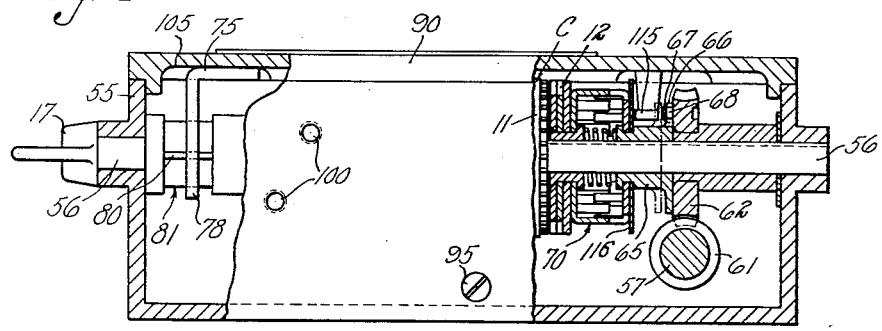
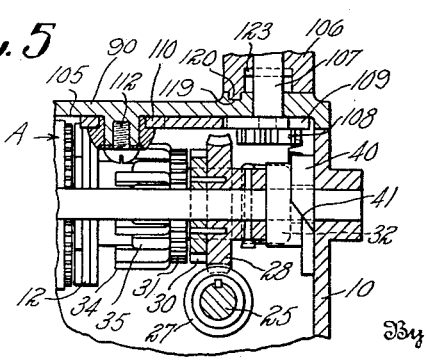
Inventor
HARVEY N. BLISS
EDWARD WILD
WILLIAM L. TANCRED
By N. Clay Lindsey
Attorney Patented Dec. 28, 1937

2,103,659

UNITED STATES PATENT OFFICE 2,103,659

MULTIPLEX COUNTING MACHINE

Harvey N. Bliss, West Hartford, and Edward Wild and William L. Tancred, Hartford, Conn., assignors to Veeder-Root Incorporated, Hartford, Conn., a corporation of Connecticut Application February 20, 1936, Serial No. 64,846

11 Claims. (Cl. 235—110)

This invention relates to registering mechanism for counting the number of operations or sequence of movement of machines or the like. As an instance of a use to which the present invention may be applied, reference may be had to weaving looms wherein it is desirable that the number of operations of the machine during each of the several shifts may be counted in order to determine, for example, the amount of pay to be received by the several operators. It is the usual practice, in connection with looms, to provide a counter machine having a casing housing a number of counter devices, one device for each shift. The number of picks is adapted to be selectively registered on the counter devices. It is apparent that our improved arrangement may be employed on machines other than looms but, for convenience, the following description will proceed on the assumption that the mechanism disclosed is to be employed in that connection.

The aim of the invention is to provide an improved, simple, and effective arrangement by means of which a counter unit may be quickly and readily added to, so as to become part of the organization of, another counter unit and thereby increase the number of counter devices in the machine. More particularly, the aim of the invention is to provide an improved arrangement by means of which a duplex counting machine having two counter devices with means for selectively and operatively connecting them to a drive shaft may be converted into a machine having three counting devices, and to accomplish this object without requiring any machining operations on the duplex counter to effect such conversion. With our improved arrangement, in the event the owner of a loom, having on it a duplex counter capable of taking care of two shifts, desires a counter mechanism for taking care of three shifts, an additional counter unit may be quickly and easily added to the duplex counter already installed without the requirement of any special tools or any unusual skill on the part of the person making the conversion. Thus, the necessity of discarding the old duplex counter and installing an entirely new triplex machine, for example, is eliminated.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown, for illustrative purposes, one embodiment which the present invention may take:

Fig. 2 is a vertical sectional view through the arrangement, this view being taken substantially on line 2—2 of Fig. 1 and showing the manner in which the several counter devices may be locked against resetting;

Fig. 3 is a vertical sectional view taken substantially on line 3—3 of Fig. 1 and illustrating the drive for the counter devices;

Fig. 4 is a horizontal sectional view taken substantially on line 4—4 of Fig. 1 and illustrating the additional counter unit;

Fig. 5 is a detail view taken substantially on line 5—5 of Fig. 1 and illustrating the means for selectively rendering the counter devices operative one at a time.

Figure 1:
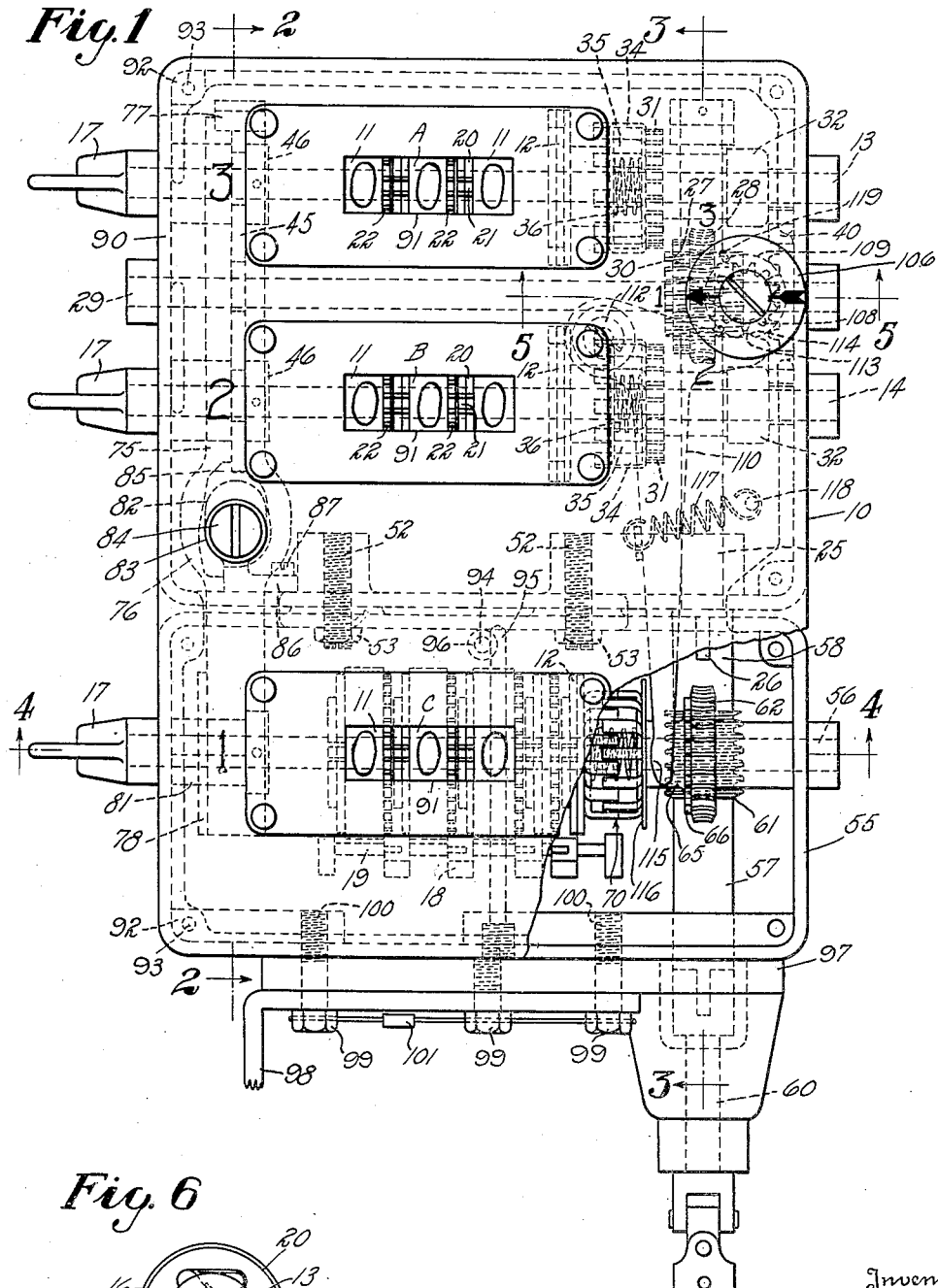
Figure 1 is a front view of an arrangement in which our improvements are incorporated.
Figure 6:
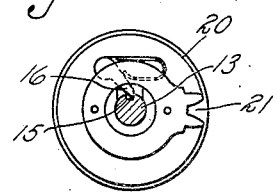
Fig. 6 is a detail view showing the means whereby the resetting shaft picks up the numeral wheels during the resetting operation.

Referring to the drawings in detail, there is shown a duplex counter machine of old and well-known type, the same comprising a casing 10 of rectangular or box-like form within which is housed a pair of counter devices A and B respectively. Each counter device may comprise a plurality of numeral wheels 11 and speed reduction wheels 12 through which the numeral wheels are driven. The numeral wheels and the speed reduction wheels of this device A are supported for rotary movement in one direction on, and relative to, a reset shaft 13. The corresponding reset shaft of the counter device B is designated by the numeral 14. Each of the reset shafts is provided with a longitudinally extending groove 15, and each of the numeral wheels is provided with the usual spring pressed reset pawl 16 adapted to engage in the groove 15 when the reset shaft is rotated by a handle 17 in the proper direction. Between the adjacent numeral wheels 11 are transfer means of any suitable sort, the same being shown in the present instance as comprising transfer pinions 18 of the character shown in the patent to Orme No. 368,163 dated August 9th, 1887. These pinions are mounted for rotation on pins or shafts 19, and each pinion has wide teeth and alternately disposed narrow teeth. On the wheel of lower order is provided a concentric peripheral locking surface 20 which is provided with a notch 21 adapted to accommodate the wide pinion teeth. On the adjacent side of the wheel of next higher order are provided gear teeth 22 adapted to receive both the wide teeth and the narrow teeth. This construction, being an old and well-known one, requires no further description.

The numeral 25 designates a drive shaft section journalled in the casing 10 at right angles to the shafts 13 and 14 and having its lower end projecting through the bottom of the casing and provided with a driving connection 26 in the form of a tongue. Fixed to the shaft 25 is a worm 27 meshing with a worm wheel 28 fixed on an intermediate shaft 29 located between and parallel to the shafts 13 and 14. Also fixed to this shaft 29 is a gear 30 adapted to selectively mesh with gears 31, 31 respectively associated with the counter devices A and B. The gears 31 are carried by sleeves 32 slidably journalled on the shafts 13 and 14. Between each gear 31 and its associated first multiplying wheel is a slidable connection in order to allow the gear 31 to be moved into and out of meshing engagement with the gear 30. Each sliding connection comprises fingers 34 projecting from the sleeve 32 and fingers 35 projecting from the first multiplying wheel, these fingers being in interlocking relation as illustrated. About each shaft 13 and 14 and between the driving and driven elements of the slidable connection is a compression spring 36.

The gears 31 and 31 may be selectively engaged with the drive gear 30 through the instrumentality of a cam 40 mounted for oscillation on the shaft 29 and having cam surfaces 41 and 42 adapted to respectively engage the right-hand ends of the sleeves 32. Duplex counters of this type are ordinarily provided with a cover coextensive with the front of the casing 10, and this cover carries a manually operable member for setting the cam 40 and thereby selectively shifting the breakable connections, comprising the gears 30 and 31, into and out of operation. This manually operable member is later described in connection with the novel features of the present invention.

In order to prevent tampering with the resetting means by unauthorized persons, mechanism is provided for locking the reset shafts and reset handles 17 against rotation. This locking mechanism includes a movable lock bar 45 and disks or collars 46, the latter being respectively fixed to the left-hand ends of the reset shafts. The bar 45 has openings 47 for accommodating the disks 46. One end of each opening is flattened, as at 48, and each disk is provided with flat surfaces 49. A slot is also provided intermediate of the ends of the lock bar to receive shaft 29 therethrough and limit the extent of lock bar movement. It is usual to provide a lock in the casing 10 at one end of the lock bar 45 so as to lock the latter against surfaces 48 as shown in Fig. 2.

In accordance with the present invention, there is provided an additional counter unit which may be added to the duplex unit above described in order to provide a three shift assembly. This additional unit has a casing 55 which is preferably of the same cross sectional shape as that of the casing 10. The casings are secured together by screws 52 and nuts 53. The screws are threaded into the bottom wall of the casing 10 and freely extend through holes in the top wall of the casing 55. Located in the casing 55 is a counter device C which is generally similar to the counter devices A and B heretofore described, and includes numeral wheels 11 and speed reduction wheels 12 mounted on a reset shaft 56.

Journalled in the top and bottom walls of the casing 55 is a drive shaft section 57 disposed at right angles to the reset shaft 56 and adapted to be aligned with the shaft section 25 when the casings 10 and 55 are secured in proper abutting relation. The upper end of the drive shaft section 57 has a kerf 58 adapted to receive the tongue 26. On the lower end of the shaft section 57 is a tongue 59 adapted to receive the kerf in the upper end of an operating shaft 60. Fixed to the shaft section 57 is a worm 61 meshing with a worm wheel 62 loose on the shaft 56. Between the worm wheel 62 and the counter device C is a breakable connection which is here in the form of a clutch. This clutch includes a sleeve 65 loose on the shaft 56 and having a flange 66 provided with notches 67 adapted to disengageably receive pins 68 projecting from the face of the gear 62. Between the sleeve 65 and the first speed reduction wheel 12 is a slidable connection 70 which is similar to the slidable connections heretofore described.

In order to lock the reset shaft 56 against rotation simultaneously with the locking of both reset shafts 13 and 14 of the counters A and B, we have provided a slidable lock bar 75 which operatively engages movable bar 45. Lock bar 75 has an elongated body portion 76 arranged for slidable movement within a cover, as will be later described, and above the edges of the adjacent walls of casings 10 and 55 so that the necessity of cutting these walls will be eliminated when adding the bottom unit to the duplex unit. As shown in Fig. 2, the upper end of bar 75 has an inward projection 77 engageable with the upper end of bar 45, and the lower end of bar 75 terminates in an inwardly projecting end portion 78 having a substantially V-shaped seat 79 therein adapted to receive the mating nose 80 of a cam 81 thereagainst and thus prevent rotational movement of shaft 56 to which the cam 81 is secured. A slotted hole 82 passes through body portion 76 intermediate of its ends, and the barrel 83 of a cylinder type lock 84 associated with the duplex counter projects therethrough. This slotted hole is of such size as to permit and limit the slidable movement of bar 75 between locked and unlocked positions. The lower end of bar 45 is adapted to rest upon the periphery of locking disk or cam 85 carried at the inner end of barrel 83 by lock 84. As usual, the lock is so constructed that the key cannot be withdrawn except when the lock is in locked condition. This lock may be carried by a bracket 86 secured by screws 87 to the bottom wall of the casing 10. Hence, it will be apparent that cam 85 may be rotated into engagement with bar 45 to move surfaces 48 and 49 into locking contact and slidably lift bar 75, causing a simultaneous locking of cam nose 80 within seat 79, thereby preventing rotation of the reset shafts at this time. When cam 85 is in an unlocked position, bars 45 and 75 will slidably move downward from their respective locked positions, and the reset shafts may be turned to bring the count wheels back to zero positions.

The two casings 10 and 55 have a single or common cover 90 which is provided with windows 91 through which the numerals on the numeral or indicating wheels of the several counter devices may be observed. The cover has, extending from its rear face, lugs 92 adapted to respectively engage in the several corners of the casings 10 and 55. The cover is held in place by screws 93 which extend through the backs of the casings and are screwed into the lugs 92. For the purpose of preventing the unauthorized removal of the cover, there may be provided a lock screw 94 with which cooperates a seal screw 95. The lock screw has an annular groove 96 in its head, and the seal screw extends into this groove. The seal screw passes through and is threaded into the bottom wall of the casing 55. When the composite counting machine is installed, it is positioned on a plate 97, and this plate and the bottom casing are secured to a bracket 98 by screws 99 which are screwed into threaded openings 100 in the bottom wall of the casing 55. These screws are sealed in place by a sealing member 101. Thus, access to the seal screws 95 and removal of the cover are prevented unless the seal 101 is first broken. In order to permit the elongated body portion of the lock bar 75 to pass in front of the adjoining walls of the casings, the cover is recessed, providing an opening 105 through which the lock bar is free to move.

The counter devices A, B, and C are selectively connected, one at a time, to the drive shaft comprising the sections 25 and 57 by a manually operable member carried by the cover. This manually operable member includes a knob 106 located on the outer end of the stud shaft 107 journalled in the cover. On the inner end of this shaft is a gear 108 meshing with the teeth of the cam 40. Also fixed to the shaft 107 and immediately above the gear 108 is a shift cam 109 having a single lobe 114 and which cooperates with a bell crank shift lever 110 associated with the breakable connection of the counter device C. This lever lies within the recess 105 in the rear face of the cover and is pivoted in this recess on a screw 112. The upper end of the lever is provided with a short arm having a curved boss 113 adapted to engage the periphery of the shift cam 109. The lever also has a long depending arm provided with a boss 115 adapted to engage a disk 116 fixed to the clutch sleeve 65. The lever is normally urged, by a spring 117, in a direction to maintain engagement between the projection 113 thereof and the shift cam. One end of the spring 117 is connected to the long arm of the lever 110, and the other end to a stud 118 carried by the cover 90. In order to hold the shifting mechanism in any desired set position, there is provided in the cover and about the shaft 107 a plurality of recesses 119 in which is adapted to selectively engage a pin 120 projecting from the rear end of the knob 106. In the present instance, there are three such recesses respectively corresponding to the three counter devices. The knob is slidably mounted on the shaft 107 and is splined thereto by a key 123 in order to permit the pin 120 to be withdrawn from one recess 119 and engaged in another one when it is desired to set the shifting mechanism. The knob is held from withdrawal from the shaft by a screw 121. A spring 122 normally urges the knob towards the casing.

From the foregoing description taken in connection with the accompanying drawings, it will be observed that, when it is desired to convert the duplex counter into a machine having three counters, the original cover of the duplex counter is removed, and the casing 55 is brought into abutting relation with and secured to the bottom wall of the casing 10. The lock bar 75 is positioned with the lock 84 extending through hole 82 and projection 77 engaging the upper end of lock bar 45. The cover 90 is then brought into covering position on the casings and secured in place by the screws 93. When the cover is so located, it holds and guides the lock bar 75, and the gear 108 is engaged with the teeth of the cam 40. The composite counter machine may now be mounted upon the bracket 98, as previously described. This conversion from a two shift to a three shift arrangement may be very quickly and readily brought about without the necessity of any machining or tooling operations in the field, that is, at the place of installation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In combination, a plurality of counter units arranged in abutting relation, each unit including a casing, a counter device within the casing and having numeral members, a sectional drive member journalled in the casing, and a breakable connection between said drive member and the counter device; means for securing said casings together with adjacent walls in abutting relation; a cover for said casings; and means for selectively shifting said breakable connections into and out of operation and including manually operable means carried by said cover and a shift member supported by said cover and extending across the forward edges of the abutting walls of the casings for operatively connecting said manually operable means with one of said breakable connections.

2. In combination, a pair of counter units arranged in abutting relation, each unit including a casing, a counter device within the casing and having numeral members, a sectional drive member journalled in the casing, and a breakable connection between said drive member and the counter device; means for securing said casings together with adjacent walls in abutting relation; a cover for both of said units; and means for selectively shifting said breakable connections into and out of operation and including manually operable member carried by said cover and extending into one of said casings and a lever pivoted to said cover and extending forwardly of the abutting walls of said casings and operatively connecting said manually operable member with the breakable connection in the other of said casings.

3. In combination, a pair of counter units arranged in abutting relation, each unit having a casing, a counter device within the casing and having numeral members, a sectional drive member journalled in the casing, and a breakable connection between said drive member and the counter device; means for securing said casings together in abutting relation; a cover for said casings and having on its inner face a groove extending from one casing to the other; and means for selectively shifting said breakable connections into and out of operation and including a manually operable member carried by said cover and a shift member within said groove of said cover for operatively connecting said manually operable member to one of said breakable connections.

4. In combination, a duplex counter unit including a casing, a pair of counter devices within the casing and each having numeral members, a drive member journalled in said casing, and a breakable connection between said drive member and each of said counter devices; a second counter unit having a casing, a counter device within the casing and having numeral members, a drive member journalled in said casing, and a breakable connection between said drive member and counter device; means for securing said casings together in abutting relation; a cover for both of said units; and means for selectively shifting said breakable connections into and out of operation and comprising a manually operable member carried by said cover and operatively associated with the breakable connections of said duplex counter unit and a shift member operatively connecting said manually operable member with the breakable connection of the second unit.

5. In combination, a duplex counter unit having a casing, a pair of counter devices therein and each having numeral members, a sectional drive member journalled in said casing, and a breakable connection between said drive member and each counter device; a second unit having a casing, a counter device therein having numeral members, a sectional drive member journalled in the casing, and a breakable connection between said drive member and counter device; a cover for both of said casings and having a groove in its inner face extending across the abutting walls of said casings; means for securing said casings together in abutting relation; and means for selectively shifting said breakable connections into and out of operation and including a manually operable member carried by said cover and operatively associated with the breakable connections of said duplex counter unit and a shift member operatively interposed between said manually operable member and the breakable connection of the second unit, said shift member being supported by said cover within said groove.

6. In combination, a duplex counter unit having a casing, a pair of counter devices therein and each having numeral members, a sectional drive member journalled in said casing, and a breakable connection between said drive member and each counter device; a second unit having a casing, a counter device therein having numeral members, a sectional drive member journalled in the casing, and a breakable connection between said drive member and counter device; a cover for both of said casings and having a groove in its inner face; means for securing said casings together in abutting relation; and means for selectively shifting said breakable connections into and out of operative relation and including a manually operable member carried by said cover and operatively associated with the breakable connections of said duplex counter unit and a lever pivoted to said cover and located in said groove and operatively connecting said manually operable member with the breakable connection of the second counter unit.

7. In combination, a duplex counter unit having a casing, a pair of counter devices therein and each having numeral members, a sectional drive member journalled in said casing, and a breakable connection between said drive member and each counter device; a second counter unit having a casing, a counter device therein having numeral members, a sectional drive member journalled in the casing, and a breakable connection between said drive member and counter device; a cover for both of said casings and having a groove in its inner face; means for securing said casings together in abutting relation; and means for selectively shifting said breakable connections into and out of operation and including a manually operable member carried by said cover and operatively connected to said breakable connections of said duplex counter unit, a cam connected to said member, and a lever located in said groove and pivoted to said cover and operatively connecting said cam with the breakable connection of the second unit.

8. In combination, a pair of counter units arranged in abutting relation, each unit including a casing, a counter device within the casing and having numeral members, and means for resetting the counter device; a sectional drive shaft through which said counter devices are operated; means for securing said casings together in abutting relation; a cover for said casings; and means for locking said resetting means against operation and including a lock bar in each casing, an operative connection between the lock bars and extending in front of the forward edges of the abutting walls of the casings and behind said cover, and a locking instrumentality located within one of said casings and arranged to lock both lock bars in operative position.

9. In combination, a pair of counter units arranged in abutting relation, each unit including a casing, a counter device within the casing and having numeral members, and means for resetting the counter device; a sectional drive shaft through which said counter devices are operated; means for securing said casings together in abutting relation; a cover for both of said casings and having a groove crossing the forward edges of the abutting walls of the casings; and means for locking said resetting means against operation and including a lock bar in each casing, one of said bars having an extension accommodated by said groove in said cover and associated with the other bar, and a locking instrumentality mounted within one of said casings and adapted to lock said lock bars in operative positions.

10. In combination, a pair of counter units arranged in abutting relation, each unit including a casing, a counter device within the casing and having numeral members, means for resetting the counter device, a sectional drive member journalled in the casing, and a breakable connection between said drive member and the counter device; means for securing said casings together in abutting relation; a cover for said casings; means for selectively shifting said breakable connections into and out of operation and including manually operable means carried by said cover and a shift member supported by said cover and extending across the forward edges of the abutting walls of said casings for operatively connecting said manually operable means with one of said breakable connections; and means for locking said resetting means against operation and including a lock bar in each casing, an operative connection between the lock bars and extending in front of the forward edges of the abutting walls of the casings behind said cover, and a locking instrumentality located within one of said casings and arranged to lock both lock bars in operative position.

11. In combination, a pair of counter units arranged in abutting relation, each unit having a casing, a counter device within the casing and having numeral members, means for resetting the counter device, a sectional drive member jurnalled in the casing, and a breakable connection between said drive member and the counter device; means for securing said casings together in abutting relation; a cover for said casings and having on its inner face grooves extending from one casing to the other; means for selectively shifting said breakable connections into and out of operation including a manually operable member carried by said cover and a shift bar within one of said grooves of said cover for operatively connecting said manually operable member to one of said breakable connections; and means for locking said resetting means against operation and including a lock bar in each casing, one of said bars having an extension accommodated by one of said grooves in said cover and associated with the other of said lock bars, and a locking instrumentality mounted within one of said casings and adapted to lock said lock bars in operative positions.

HARVEY N. BLISS.
EDWARD WILD.
WILLIAM L. TANCRED.